United States Patent [19]

Mallas

[11] Patent Number: 5,027,763
[45] Date of Patent: Jul. 2, 1991

[54] ONE-PIECE PUSH ROD HAVING ENLARGED SPHERICAL SEAT

[75] Inventor: Angelos Mallas, Mt. Clemens, Mich.

[73] Assignee: Mall Tooling and Engineering, Mt. Clemens, Mich.

[21] Appl. No.: 446,302

[22] Filed: Dec. 5, 1989

[51] Int. Cl.$^5$ ............................................. F01L 1/14
[52] U.S. Cl. ................................................. 123/90.61
[58] Field of Search ............... 123/90.61, 90.62, 90.63, 123/90.64

[56] References Cited

U.S. PATENT DOCUMENTS

| | | |
|---|---|---|
| 1,594,471 | 8/1926 | Short . |
| 1,663,191 | 3/1928 | Carlson . |
| 1,823,419 | 9/1931 | Almen . |
| 1,948,415 | 2/1934 | Cooper . |
| 2,019,444 | 10/1935 | Church . |
| 2,419,316 | 4/1947 | Engemann ....................... 123/90.62 |
| 2,434,080 | 1/1948 | Rosa . |
| 2,743,712 | 5/1956 | Hulsing . |
| 2,818,843 | 1/1958 | Frank . |
| 2,851,980 | 9/1958 | Kraicinski . |
| 2,857,895 | 10/1958 | Scheibe . |
| 2,878,796 | 3/1959 | Mannerstedt ..................... 123/90.63 |
| 2,897,805 | 8/1959 | Etzler . |
| 2,960,080 | 11/1960 | Burnard et al. . |
| 3,034,488 | 5/1962 | Reiners . |
| 3,086,507 | 4/1963 | Mooney . |
| 3,468,007 | 9/1969 | Nakamura . |
| 3,549,853 | 12/1970 | Guido ................................. 219/104 |
| 3,789,650 | 2/1974 | Alexoff ................................ 72/360 |
| 4,218,996 | 8/1980 | Usui ................................. 123/90.61 |
| 4,317,267 | 3/1982 | Usui .................................... 29/156.7 |
| 4,436,063 | 3/1984 | Usui ................................. 123/90.61 |
| 4,453,505 | 6/1984 | Holtzberg et al. ............... 123/90.61 |
| 4,850,315 | 7/1989 | Mallas ............................. 123/90.61 |

FOREIGN PATENT DOCUMENTS

| | | |
|---|---|---|
| 0479834 | 1/1952 | Canada . |
| 0640247 | 4/1962 | Canada . |
| 0551446 | 1/1980 | Japan . |
| 55-46025 | 3/1980 | Japan . |
| 55-146211 | 11/1980 | Japan . |
| 59-155516 | 9/1984 | Japan . |
| 59-225844 | 12/1984 | Japan . |
| 244808 | 10/1986 | Japan ............................. 123/90.61 |

Primary Examiner—Willis R. Wolfe
Assistant Examiner—Weilun Lo
Attorney, Agent, or Firm—Harness, Dickey & Pierce

[57] ABSTRACT

A one-piece push rod and method of making same is provided which includes the step of swaging at least one end of a hollow tube to define a seat portion having an extended spherical surface for inhibiting interference with a rocker arm socket. Preferably, the tube is characterized by a thicker middle portion which tapers down to the ends of reduced diameter. The spherical seat portion having an arc of revolution extending through an angle of at least approximately 210° and having a constant wall thickness is formed by first machining a taper on the tips, then cold forming the tapered tips with a punch and finally swaging the extended spherical surface.

8 Claims, 4 Drawing Sheets

ONE-PIECE PUSH ROD HAVING ENLARGED SPHERICAL SEAT

BACKGROUND OF THE INVENTION

1. Technical Field

This invention relates to push rods for engines and, in particular, to one-piece push rods especially applicable for use in automotive high speed, high compression ratio internal combustion engines equipped with high lift cams.

2. Discussion

Push rods are conventionally used between a rocker arm and cam follower in an internal combustion engine to control the opening and closing of valve seats in the engine cylinders. The following patent documents disclose a wide variety of push rod constructions: U.S. Pat. Nos. 1,594,471; 1,663,191; 1,823,419; 1,948,415; 2,019,444; 2,434,080; 2,743,712; 2,818,843; 2,851,980; 2,857,895; 2,897,805; 2,960,080; 3,034,488; 3,086,507; 3,468,007; 3,549,853; 3,789,650; 4,218,996; 4,317,267; 4,436,063; 4,453,505; Canadian patent Nos. 479,834; 640,247 and Japanese Patent Nos. 55-1446; 55-46025, 55-146,211; and 59-225844.

Hollow tubular push rods are desirable because they are generally stronger and stiffer than a solid rod of the same weight. One-piece hollow push rods having 180° hemi-spherical seats have been sold by the inventor of the present invention. These push rods consisted of elongated straight walled tubes having 180° hemi-spherical ends that were cold formed using a combination of a special forming tool and a punch similar to the ones disclosed in FIGS. 4 and 6 herein. An alternative to straight-walled push rods is described in U.S. Pat. No. 4,850,315, which is assigned to the same assignee as this present invention. More particularly, a single piece push rod is disclosed in the form of an elongated hollow tube having a middle portion with a larger outer diameter than the tube has near its ends. In a particular embodiment, the middle and end portions of the tube are cylindrical while the surfaces bridging the middle and end portions are tapered.

While such one-piece push rods have generally proven satisfactory, the present invention provides improvements thereto that are expected to provide increased performance characteristics especially when installed in engines having high lift cams. These characteristics are achievable without requiring the use of a multiple piece construction, such as the use of inserts or the like, at the ends of the push rods as disclosed in some of the above-mentioned patent literature.

SUMMARY OF THE INVENTION

According to the teachings of the present invention a one-piece push rod having an enlarged rounded seat is provided to inhibit interference with the rocker socket during full-stroke reciprocal movement of the push rod. In a particular embodiment, the seat portion of the push rod has at least 210° of rounded surface. According to the method of this invention, the tips of the one-piece tube from which the push rod is fabricated are machined with a forming tool to form a generally conical taper thereon. Then, the tapered tips are cold formed to generate a substantially hemi-spherical (180°) seat thereon. Thereafter, an enlarged seat surface extending the spherical portion to about 210° is formed, preferably by a swaging operation.

BRIEF DESCRIPTION OF THE DRAWINGS

The various advantages of the present invention will become apparent to one skilled in the art upon reading the following specification in which.

DESCRIPTION OF THE PREFERRED EMBODIMENT

It should be understood from the outset that while this invention will be described primarily in connection with one specific example, that this example is just a best mode of currently practicing this invention and that other modifications can be made to this specific example without departing from the spirit and scope of the invention.

Figure 1A:
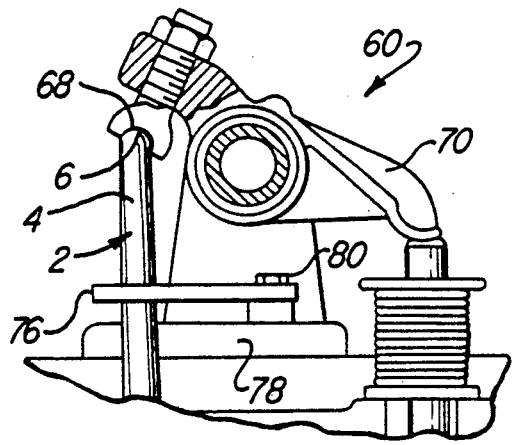
FIG. 1A is a simplified view showing a "prior art" push rod as installed in an internal combustion engine.
Figure 1B:
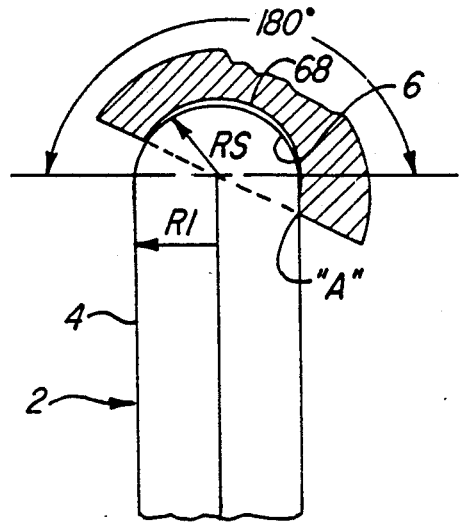
FIG. 1B is an enlarged view of FIG. 1-A illustrating the hemi-spherical seat portion of the "prior art" push rod and points of interference with a rocker arm socket.
Figure 7A:
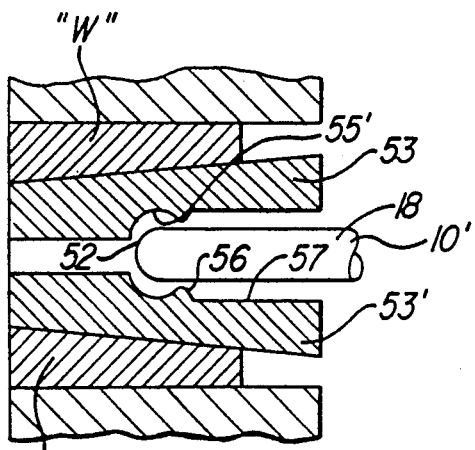
FIGS. 7A through 7C are partial cross-sectional views showing a second swaging operation for forming the enlarged spherical seat.
Figure 7B:
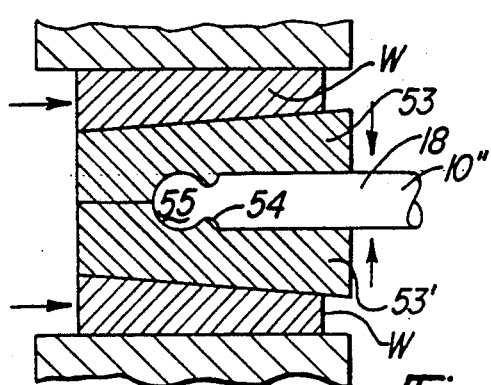
Figure 7C:
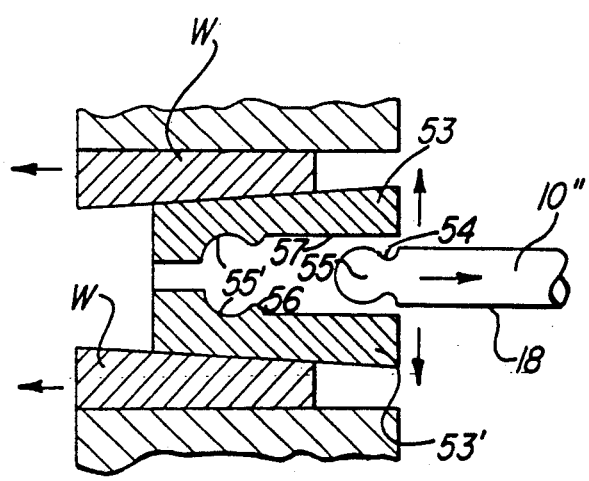
Figure 2:
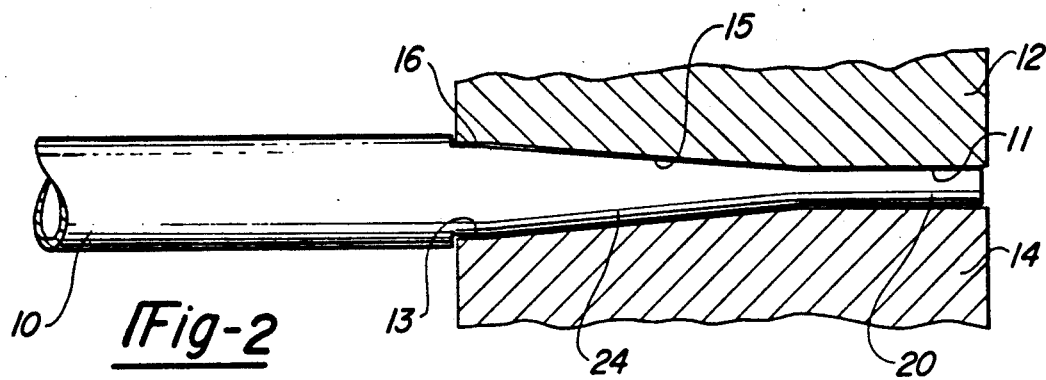
FIG. 2 is a partial cross-sectional view showing a swaging operation on a part of the original tubular starting stock.
Figure 3:
FIG. 3 is a plan view showing the tube after the completion of the first swaging operation.

Referring now to FIGS. 1A and 1B, a "prior art" push rod 2 is illustrated in use in an internal combustion engine. The conventional engine components described hereinafter are illustrated in greater detail in FIG. 9. The engine 60 includes a plurality of cylinders having intake and exhaust valves mounted on the head. The valves are operated by means of a rotatable cam 62 acting on cam follower 64. One end of generally cylindrical push rod 2 is seated in a pocket 66 provided in cam follower 64. The opposite end portion 4 of push rod 2 has a generally hemi-spherical seat 6 which is fitted within a socket 68 provided in rocker 70. Rocker 70 is suitably connected to the intake or exhaust valve. In operation, the upward forces applied by cam 62 are translated through push rod 2 thereby causing it to open or close its associated valve.

As is better seen in reference to FIG. 1B, seat portion 6 of "prior art" push rod 2 has a generally hemispherical configuration defining 180° of arcuate revolution of Radius "$R_s$" relative to a central longitudinal axis of rod 2. Radius "$R_s$" is substantially equal to the radius "$R_1$" of the end portion 4 of cylindrical push rod 2. Therefore, a smooth transition between seat 6 and end portion 4 is thus created. However, in applications where cam 62 is a high lift cam, push rod 2 is susceptible to premature failure. More particularly, at its highest point in the stroke of push rod 2 an interference point (or line) is generated, designated herein as point "A". Such interference causes excessive side thrust loading within socket 68 which can lead to seat 6 being damaged (i.e. galled) and sometimes sheared off. Alternatively, the excessive side thrust loading may cause seat 6 to "pop-out" of socket 68. The present invention is designed to eliminate such interference so as to provide increased life of the push rods.

Turning now to FIGS. 2 through 7, the method for fabricating a push rod according to a first preferred embodiment of the present invention is illustrated. In particular, the starting stock is in the form of an elongated straight-walled, cylindrical tube 10. This specific example is directed to making a push rod with an outer diameter at its ends of 5/16 inch (0.3125 inch). The outer diameter of the starting stock is considerably larger, preferably about 0.375 inch and has a wall thickness of about 0.065 inch, although different wall thickness can be used. While other materials can be used, a chrome molybdenum alloy known in the trade as No. 4130 is presently preferred. Its length is about 8 inches. One end of the starting tube 10 is inserted into the rotating dies 12, 14 of a swaging machine. The swaging machine, per se, is of conventional design. As is known in the art, the dies 12, 14 rotate and draw the stock inwardly while they compress the metal into the shape of the dies. In the preferred embodiment, the dies are in the desired shape of ½ of the length of the push rod.

Figure 8:
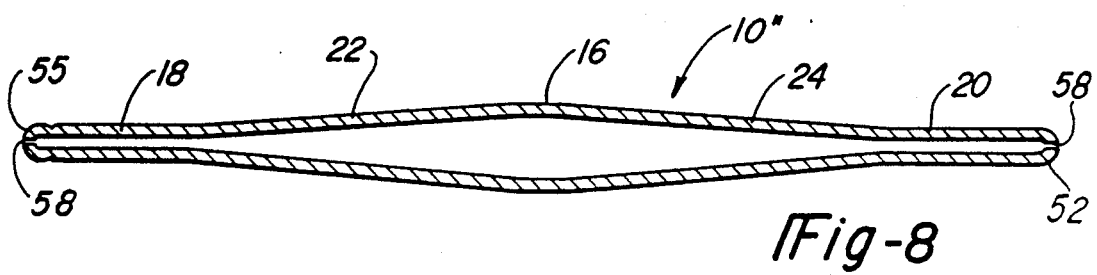
FIG. 8 is a cross-sectional view of a push rod made in accordance with the teachings of the present invention.

The desired shape of the push rod after the swaging operation is shown in FIG. 8. It is characterized by a relatively thick flat right cylindrical middle surface 16 which, in this example, has an OD of about 0.350 inch. The outer walls of the rod then taper downwardly to end portions 18 and 20 in the form of right circular cylinders (i.e., having flat, parallel walls when viewed in cross-section), each having a radius "$R_1$" which defines an outer diameter of about 0.311 inch (+0.005 inch, - 0.000 inch). Thus, end surfaces 18 and 20 will fit within conventional guide plates having a 5/16 inch slot. The length of end surfaces 18 and 20 depends upon the location of the guide plates and should for practical purposes be between ¾ and 1 ½ inch. In this example, the axial length of end surfaces 18 and 20 are each about 1.4 inch (+0.05 inch, - 0.000 inch). Bridging middle surface 16 and end surfaces 18, 20 are conical tapered surfaces 22 and 24. Preferably, surfaces 22, 24 are linear although slightly convex surfaces should be acceptable. Concave surfaces and sharp corners are to be avoided. In this example, the axial length of the tapered surfaces 22, 24 are each about 2.4 inch (+0.050 inch).

It is preferred that the end portions 18 and 20 are compressed so that their outer diameters are between 50-90% of the outer diameter of the original tube stock 10. In the above example, the end surfaces 18 and 20 have been compressed to about 83.2% of the original OD of the stock 10. Failure to reduce the end surfaces to at least 90% is disadvantageous because it probably would not result in the desired strength. On the other hand, if the surfaces 18, 20 were compressed to below about 50% of the original OD of the stock 10 then the inner bore would probably become closed and thereby restrict oil flow through the tube.

The middle portion 16 should be reduced, when necessary, to an outer diameter that is sufficiently small that it can fit within the engine block without interference and to avoid sharp corners. It may not be absolutely necessary to reduce the middle portion depending on the availability of starting stock with the appropriate size.

The swaging machine dies 12 and 14 are suitably shaped to meet these design constraints. Their interior surfaces define a cavity having a small right cylindrical portion 11 at the far end, a larger right cylindrical portion 13 at the front or feed end, with tapered conical surfaces 15 diverging from small end 11 to large end 13. The stock is fed into the machine until the stock 10 reaches the point approximately shown in FIG. 2. Then the stock is removed from the machine, rotated and then reinserted into the swaging machine so that the dies can swag the opposite half of the rod. As noted before, FIG. 3 illustrates the rod after the swaging or die drawing operation.

Figure 4:
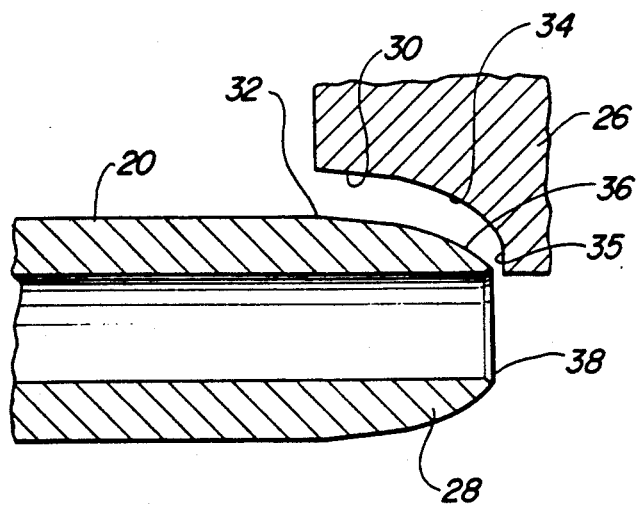
FIG. 4 is a partial cross-sectional view illustrating a tip of the tube after it has been machined with the form tool which is also shown therein.

Turning now to FIG. 4, the tips of end surfaces 18 and 20 are both machined with a forming tool 26 to form a generally conical taper 28 thereon which is about 0.210 inch in length. This is preferably accomplished by placing the tube in a lathe and rotating the workpiece while forming tool 26 removes metal in the shape of its cutting surfaces. In this embodiment, the cutting surface of the forming tool 26 begins with a line segment or flat 30 which extends at about an 8° angle to the major axis of the tube. The flat 30 in tool 26 forms a corresponding flat conical surface 32 on taper 28. The flat 30 blends into an arc S4 in forming tool 26. The arc 34 has a radius of approximately 0.450 inch (±0.015 inch) whose center is offset from end face 35 by about 0.200 inch. The arc 34 in forming tool 26 thus forms a corresponding arc surface 36 on the tips. A small chamfer 38 on the tips can optionally be formed to remove burrs and the like which may be created during machining with the forming tool 26. It should be understood that both ends or tips are, or can be, likewise formed into the general shape shown in FIG. 4.

Figure 5:
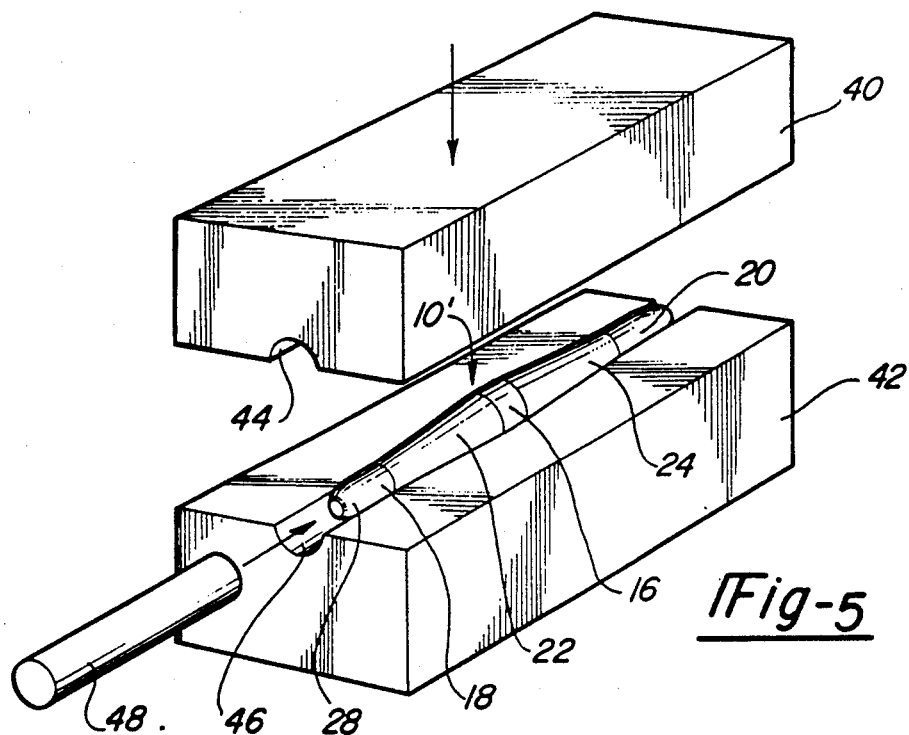
FIG. 5 is a perspective view showing the tube in a subsequent stage of operation.
Figure 6:
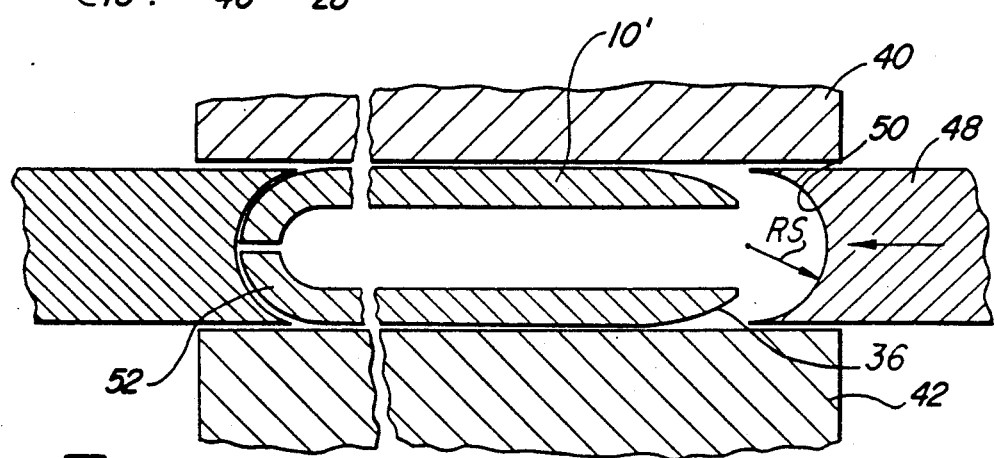
FIG. 6 is a before and after partial cross-sectional view which illustrates the formation of the hemi-spherical seat surface on the tips of the tube by a cold forming operation utilizing a punch which contacts the ends of the rods.

Turning now to FIGS. 5 and 6, the next step in the method is to place semiformed rod 10' into a pair of holding dies 40 and 42. The dies 40, 42 have mutually opposing cavities 44 and 46 respectively, which correspond in shape to the outline of rod 10' and have bore extensions at both ends dimensioned to receive punches 48 for cold forming the tips of the rod 10'. The holding dies 40, 42 are held together under pressure to prevent movement of rod 10' during the cold forming operation which is shown best in FIG. 6. The right hand portion of FIG. 6 illustrates the relative shape of the rod tips before they are struck with punch 48, whereas the left hand portion of FIG. 6 shows the shape of the tips after being cold formed. The punch 48 includes a concave 180° hemi-spherical striking surface 50 having about the desired diameter of the tips of the push rod. In this example, surface 50 has a radius "$R_s$" of about 0.151 (+0.003 inch, -0.000) which approximates the desired 5/16 diameter seat surface for the desired end product. The opposite end of punch 48 is struck with sufficient force to cause the metal to flow together and form a substantially hemi-spherical seat 52 which has a substantially the same wall thickness as the wall thickness of the remaining portion of the rod. More specifically, seat 52 defines 180° of arcuate revolution of radius "$R_s$"

relative to a central longitudinal axis of rod 10'. Radius "$R_s$" is substantially equal to Radius "$R_1$" of end portions 18 and 20 thereby creating a smooth transition between seat 52 and an outer surface of the respective end portions.

The next step in the method is to enlarge the generally hemi-spherical seat 52 by extending the arc of revolution of radius "$R_s$" to be greater than 180°, and preferably to at least 210°. Preferably, one of the end portions 18 and 20 is inserted into rotating dies 53 and 53' of a swaging machine. The general swaging process is illustrated in reference to FIGS. 7A through 7C. Again, the swaging machine, per se, is of conventional design. As is known in the art, dies 53, 53' are driven radially inwardly by wedges "W" and rotate while they compress the metal into the shape of the dies. In the preferred embodiment, the dies 53, 53' are configured to generate an annular groove or recess 54 in push rod 10". The recess 54 is configured to extend the generally hemi-spherical seat 52 from 180° of rounded surface to at least approximately 210° of spherical surface. The desired shape of push rod 10" after this second swaging operation is shown in FIG. 8. The enlarged or extended spherical seat portion is hereinafter designated as reference numeral 55. Furthermore, annular groove 54 has a first groove surface defining the portion of seat surface 55 which was extended. Specifically, the first groove surface defines the extended spherical surface extending from about 180° to preferably at least 210° of arcuate revolution of radius "$R_s$". A second groove surface connects the first groove surface to an outer surface of the end portion. Preferably, the second groove surface interfaces with the first groove surface at the point where the extended spherical seat surface terminates (approximately 210° of spherical arcuate revolution of radius "$R_s$").

The swaging machine dies 53 and 53' are suitably shaped to meet the desired design requirements. Their interior surfaces define a cavity having at least approximately 210° of spherical seat surface portion 55' at the far end, a return tapered portion 56 defining the second groove surface of annular groove 54, and a generally right cylindrical portion at the feed end. Cylindrical portion 57 is of substantially the same diameter as that of the push rod portion it supports, such as end portion 18.

Thereafter, push rod 10" can be removed from the swaging machine, rotated and then reinserted into the machine for swaging the opposite seat portion of the rod.

One preferred embodiment of the final push rod product 10" having only one extended seat portion 55 is shown in FIG. 8. Holes 58 are drilled through the tips to insure that oil flow is not impeded and to remove burrs, fragmented metal and the like.

Figure 9:
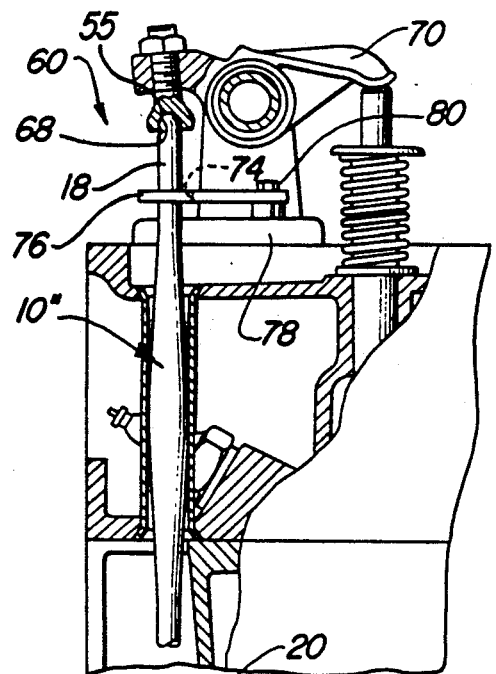
FIG. 9 is a simplified view showing the push rod of the present invention in use in an internal combustion engine.
Figure 11:
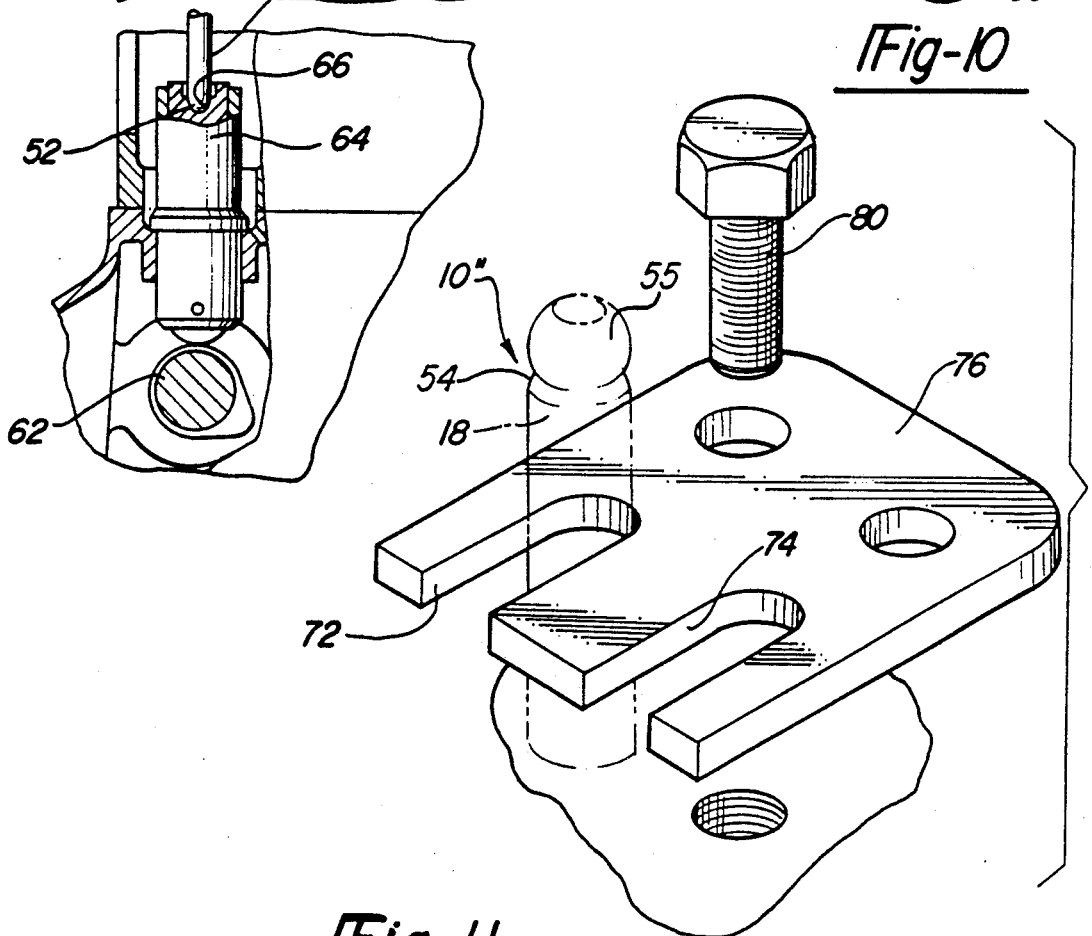
FIG. 11 is a perspective view of the push rod and a typical guide plate.

FIGS. 9 and 11 illustrate the push rod 10" in use in a conventional internal combustion engine 60. As previously described, engine 60 includes a plurality of cylinders having intake and exhaust valves mounted on the head. The valves are opened by means of a cam 62 that pushes upward on cam follower 64. The seat 52 on end portion 20 of push rod 10" fits within a pocket 66 in cam follower 64. Extended seat 55 on opposite end portion 18 engages socket 68 formed in rocker 70. Rocker 70 is suitably connected to the intake or exhaust valve. Cylindrical end portion 18 rides within one of the slots 72, 74 formed in guide plates 76 which is suitably attached to block 78 via fasteners 80. Guide plates 76 serve to prevent lateral movement of push rods and are often found in many high performance engines. They can be located at various locations within the engine. Thus, the length of the cylindrical end portion of rod 10" should be sufficient to accommodate for these different locations and for the reciprocal movement of the rod. In operation, the upward forces applied by cam 62 are translated through push rod 10" upwardly to rocker 70 causing it to open or close its associated valve. The hollow interior of push rod 10" is used as a passageway for lubricating the various parts.

Figure 10:
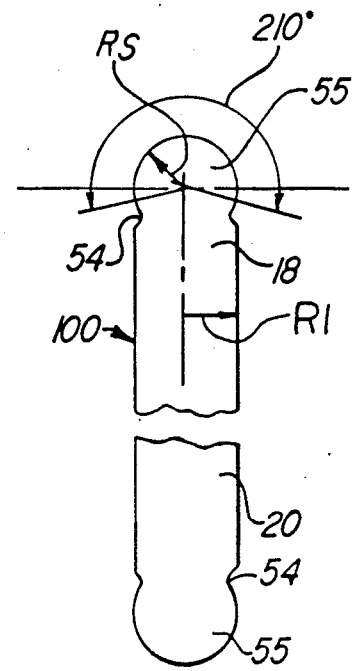
FIG. 10 is an enlarged view of the extended spherical seat portion illustrating use thereof on both ends of a push rod.

Alternatively, as shown in FIG. 10, a push rod 100 can be provided with extended spherical seat surfaces 55 on both tips. Additionally, the present invention, while disclosed in combination with tapered one-piece push rods is likewise applicable to one-piece push rod designs having a uniform cross-section across its entire length; that is, so called "straight-walled" rods having a constant cylindrical cross-section.

It is the application of the extended spherical seats 55 at one or both ends of a one-piece push rod which is the improvement over the art. Extending the arc of revolution of radius "$R_s$" past the "prior art" (180° hemispherical) seat configuration substantially reduces interference problems commonly associated with the socket/seat interface between the one-piece push rod and the rocker assembly or the cam follower assembly. It is believed that a seat surface having at least approximately 210° of arcuate revolution of radius "$R_s$" would substantially eliminate such interference conditions. Additional arcuate extension of spherical seat surface 55 (surface having an arc of revolution of radius "$R_s$" greater than approximately 210°) is contemplated to be within the scope of this invention. However, such an extension would be dependent on a specific engine application, loading characteristics, stroke parameters and the characteristics of the material used.

The push rods 10" and 100 are relatively light weight, as compared with solid rods and thereby increases the efficiency of the engine. It is also expected to achieve better bending resistance and strength than conventional hollow push rods. The ends of a push rod are particularly susceptible to failure since they receive the primary force which can be quite large, especially in high performance engines using high lift cams. The tapered surfaces and/or the increased spherical surface area of the seat 55 tend to counteract forces which cause bending in the rod. Such bending is to be avoided since it can detrimentally effect the performance of the engine. The design of the present invention does not require any modification of the other engine components and, in fact, can be interchangeable with conventional rods. All of these advantages are obtained without requiring the use of inserts or other nonhomogeneous parts that have been welded or otherwise secured to the prior art push rods. Such inserts are known to fall off and can cause severe damage to the engine.

Various other advantages and modifications will become apparent to one skilled in the art after having the benefit of studying the teachings of this specification, drawings and following claims.

What is claimed is:

1. In an internal combustion engine having a push rod between a rocker assembly and a cam follower assembly in which said push rod slides in a slot in a guide plate, the improvement wherein:

a single piece of metal in the form of an elongated hollow tube having a middle portion, first and second end portions and rounded seats at the tips thereof, said middle portion having a larger outer diameter than the end portions, said tube having a substantially constant wall thickness throughout the length of the tube and the tips thereon, and at least one of said seats having a rounded seat surface extending through an angle in excess of 180 degrees, said at least one seat being in direct engagement with said rocker assembly.

2. The improvement of claim 1 wherein said rounded seat surface is generally spherical being defined by an arc of revolution extending through an angle of at least approximately 210°.

3. The improvement of claim 2 wherein said end portions and said arc of revolution of said seat surface are defined by a common radius such that said spherical seat surface defines an annular groove between said seat surface and said end portion.

4. The improvement of claim 3 wherein said annular groove is characterized by a first groove surface defined by that portion of said spherical seat surface having an arc of revolution which is greater than 180°, and a second groove surface connecting said first groove surface to an outer surface of said end portion, said second groove surface interfacing with said first groove surface at a point in which said arc of revolution is at least approximately 210°.

5. The improvement of claim 1 wherein said middle portion and said first and second end portions have a constant radius $R_1$ such that said push rod is an elongated right cylindrical tube having a uniform outer diameter.

6. The improvement of claim 1 wherein said middle portion has a larger outer diameter than said end portions.

7. The improvement of claim 6 wherein the outer diameter of said middle portion is about 0.350 inch with tapered surfaces linearly converging down to the outer diameters of about 0.312 inch for said end portions, with the overall length of said tube being about 8 inches and the length of said end portions each being ¾ to 1½ inches.

8. The improvement of claim 1 wherein one end portion of said tube slides in said slot in said guide plate.

* * * * *